United States Patent
Qi et al.

(10) Patent No.: US 11,770,065 B2
(45) Date of Patent: Sep. 26, 2023

(54) CONTROL METHOD AND SYSTEM FOR THREE-PHASE GRID-CONNECTED INVERTER, AND THREE-PHASE GRID-CONNECTED INVERTER

(71) Applicant: ALTENERGY POWER SYSTEM INC., Zhejiang (CN)

(72) Inventors: Biaojie Qi, Zhejiang (CN); Jian Wu, Zhejiang (CN); Yongchun Yang, Zhejiang (CN); Yuhao Luo, Zhejiang (CN)

(73) Assignee: ALTENERGY POWER SYSTEM INC., Zhejiang (CN)

( * ) Notice: Subject to any disclaimer, the term of this patent is extended or adjusted under 35 U.S.C. 154(b) by 0 days.

(21) Appl. No.: 17/432,935

(22) PCT Filed: Dec. 18, 2019

(86) PCT No.: PCT/CN2019/126250
§ 371 (c)(1),
(2) Date: Aug. 22, 2021

(87) PCT Pub. No.: WO2021/082220
PCT Pub. Date: May 6, 2021

(65) Prior Publication Data
US 2022/0255420 A1   Aug. 11, 2022

(30) Foreign Application Priority Data

Oct. 30, 2019  (CN) .......................... 201911045352.8

(51) Int. Cl.
*H02M 7/5387* (2007.01)
*H02M 1/12* (2006.01)

(52) U.S. Cl.
CPC ......... *H02M 1/126* (2013.01); *H02M 7/5387* (2013.01)

(58) Field of Classification Search
CPC ...... H02M 1/126; H02M 7/5387; H02M 1/12; H02M 1/42; H02M 7/42; H02M 7/44;
(Continued)

(56) References Cited

U.S. PATENT DOCUMENTS 4,502,106 A * 2/1985 Glennon ........... H02M 7/53875
363/56.02
2015/0062991 A1   3/2015 Zhang et al.
(Continued)

FOREIGN PATENT DOCUMENTS

| CN | 103427435 A | 12/2013 |
| CN | 103997249 A | 8/2014 |

(Continued)

OTHER PUBLICATIONS

International Search Report for PCT/CN2019/126250 dated Jul. 31, 2020, ISA/CN.
(Continued)

*Primary Examiner* — Gary L Laxton
(74) *Attorney, Agent, or Firm* — Yue (Robert) Xu; Apex Attorneys at Law, LLP

(57) ABSTRACT

A three-phase grid-connected inverter, a control system thereof and a control method therefor. The inverter is a three-phase three-leg grid-connected inverter, and a filter capacitor is connected to a negative electrode of a DC input bus to form a filter loop, so as to filter harmonic wave in the circuit, realizing high-quality grid-connected current at small power, without increasing an inductance value, so that the parallel inverter device in the system operates stably and thus is applicable to photovoltaic microinverters. Moreover, the three-phase three-leg grid-connected inverter operates in a discontinuous conduction mode, that is, in a switching
(Continued)

cycle, the inductive current is reduced to 0, so that the switching loss of the three-phase three-leg grid-connected inverter is reduced.

9 Claims, 4 Drawing Sheets

(58) Field of Classification Search
CPC ... H02M 7/53; H02M 7/53875; H02M 1/0043
See application file for complete search history.

(56) References Cited

U.S. PATENT DOCUMENTS

| | | | |
|---|---|---|---|
| 2018/0205306 A1* | 7/2018 | Huang | H02M 7/797 |
| 2019/0305695 A1 | 10/2019 | Lung | |
| 2019/0334457 A1* | 10/2019 | Jeng | H02M 7/5395 |

FOREIGN PATENT DOCUMENTS

| | | |
|---|---|---|
| CN | 105162350 A | 12/2015 |
| CN | 105429501 A | 3/2016 |
| CN | 106887964 A | 6/2017 |
| CN | 109818519 A | 5/2019 |
| CN | 109861576 A | 6/2019 |
| CN | 110034674 A | 7/2019 |

OTHER PUBLICATIONS

First Office Action dated Oct. 8, 2021 for Chinese patent application No. 201911045352.8, English translation provided by Global Dossier.

* cited by examiner

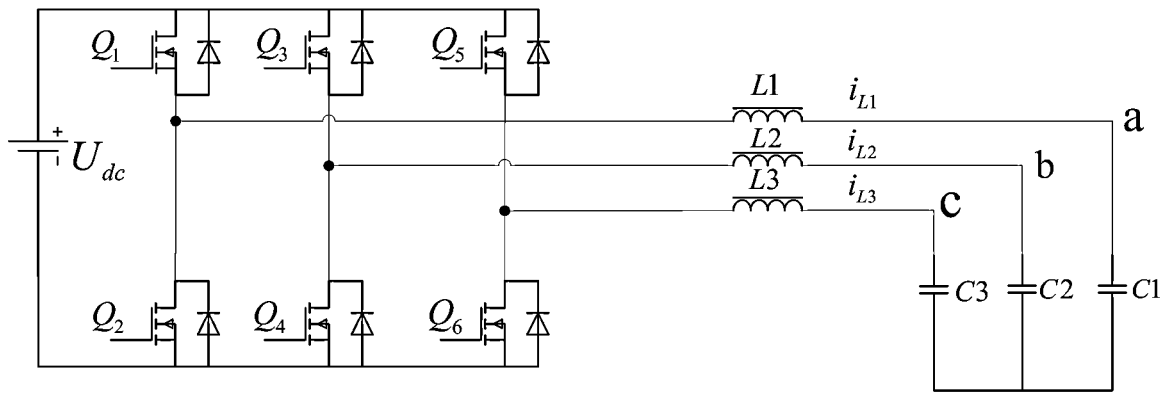

Figure 1

| Divide a power grid cycle into multiple equal intervals, where in each of the multiple equal intervals, two inductor currents are in the same direction, and other inductor current is in a direction opposite to the direction of the two inductor currents | Step S1 |

| In an interval of the power grid cycle, control the two inductor currents in the same direction in a discontinuous inductor current mode, so that fundamental wave components of the two inductor currents in the same direction are both sine waves in the power grid cycle | Step S2 |

Figure 2

CONTROL METHOD AND SYSTEM FOR THREE-PHASE GRID-CONNECTED INVERTER, AND THREE-PHASE GRID-CONNECTED INVERTER

The present application is a national phase application of PCT international patent application PCT/CN2019/126250, filed on Dec. 18, 2019, which claims priority to Chinese Patent Application No. 201911045352.8, titled "CONTROL METHOD AND SYSTEM FOR THREE-PHASE GRID-CONNECTED INVERTER, AND THREE-PHASE GRID-CONNECTED INVERTER", filed on Oct. 30, 2019 with the China National Intellectual Property Administration, both of which are incorporated herein by reference in their entireties.

FIELD

The present disclosure relates to the field of solar photovoltaic grid-connected systems, and in particular to a three-phase grid-connected inverter, and a method and a system for controlling the three-phase grid-connected inverter.

BACKGROUND

Three-phase three-leg grid-connected inverters are commonly used in a solar photovoltaic grid-connected system. Reference is made to FIG. 1, which is a schematic structural diagram of an existing three-phase three-leg grid-connected inverter. It can be seen from FIG. 1 that the three-phase three-leg grid-connected inverter has no filter circuit. As a result, the harmonics cannot be filtered out, resulting in poor quality of a waveform of a grid-connected current at low power. In the existing technology, in order to suppress magnitude of the harmonics in the three-phase three-leg grid-connected inverter, inductances of inductors L1, L2, and L3 are increased. However, a larger inductance easily results in resonance of parallel inverter in the system. Therefore, increasing the inductance is not suitable for a photovoltaic micro-inverter. Moreover, the existing three-phase three-leg grid-connected inverter usually operates in a continuous inductor current mode. That is, a current flowing continuously in the inductors L1, L2, and L3 during an entire switching cycle never reaches zero, resulting in relatively large switching loss of the three-phase three-leg grid-connected inverter.

Therefore, a solution to the above-mentioned technical problems is required to be provided by those skilled in the art at present.

SUMMARY

A three-phase grid-connected inverter, and a method and a system for controlling the three-phase grid-connected inverter are provided according to the present disclosure. With technical solutions in the present disclosure, harmonics in a circuit can be filtered out, and high-quality grid-connected current at low power is achieved. That is, without increasing the inductance, the paralleled inverter devices in the system can operate stably. The technical solutions in the present disclosure are suitable for a photovoltaic micro-inverter. Moreover, the three-phase three-leg grid-connected inverter according to the present disclosure operates under a discontinuous inductor current mode, thereby reducing switching loss of a three-phase three-leg grid-connected inverter.

To solve the above technical problems, a method for controlling a three-phase grid-connected inverter is provided according to an embodiment of the present disclosure. The method is applied to a three-phase three-leg grid-connected inverter including a filter capacitor. One terminal of the filter capacitor is connected to an output inductor of a corresponding bridge leg, and the other terminal of the filter capacitor is connected to a negative electrode of a direct current input bus. The method includes: dividing a power grid cycle into multiple equal intervals, where in each of the multiple equal intervals, two inductor currents are in a same direction, and a third inductor current is in a direction opposite to the direction of the two inductor currents; and in an interval of the power grid cycle, controlling the two inductor currents in the same direction under a discontinuous inductor current mode, to control fundamental wave components of the two inductor currents in the same direction to be sine waves in the power grid cycle.

Preferably, the controlling the two inductor currents in the same direction under a discontinuous inductor current mode includes:

controlling, when controlling a first target inductor current of the two inductor currents in the same direction, a target switch transistor corresponding to the target inductor current to be turned on;

acquiring a target inductor peak current corresponding to the first target inductor current according to a predetermined inductor peak current calculation expression:

$$\Delta I = \sqrt{\frac{T \times I \sin\omega t}{L} \frac{(U_{dc}^2 - U_{ac}^2)}{U_{dc}}}$$

where $\Delta I$ represents an inductor peak current, T represents an entire switching cycle in an interval, I represents an amplitude of an inductor current, $\omega$ represents an angular frequency of the inductor current, t represents time, L represents an inductance, $U_{dc}$ represents a voltage at a direct current side, and $U_{ac}$ represents a voltage at an alternate current side;

acquiring an actual current corresponding to the first target inductor current, and controlling the target switch transistor to be turned off when the actual current reaches the target inductor peak current; and controlling, after the first target inductor current reaches zero, in a same manner as the first target inductor current, a second target inductor current of the two inductor currents in the same direction, to alternately control the two inductor currents in the same direction under the discontinuous inductor current mode.

Preferably, after the acquiring a target inductor peak current corresponding to the target inductor current and before the actual current reaches the target inductor peak current, the method further includes: multiplying the target inductor peak current by a positive coefficient $\alpha$ to obtain a product, as the target inductor peak current corresponding to the target inductor current.

Preferably, the controlling the two inductor currents in the same direction under a discontinuous inductor current mode includes:

controlling, when controlling a first target inductor current of the two inductor currents in the same direction, a target switch transistor corresponding to the first target inductor current to be turned on;

acquiring a target on-time ratio corresponding to the first target inductor current in an entire switching period according to a predetermined on-time ratio calculation expression:

$$D = \sqrt{\frac{L \times I \sin\omega t}{T} \frac{(U_{dc} + U_{ac})}{U_{dc}(U_{dc} - U_{ac})}},$$

and acquiring target turn-on duration corresponding to the target inductor current in the entire switching period based on the target on-time ratio, where T represents an entire switching cycle in an interval, D represents an on-time ratio in the entire switching cycle, I represents an amplitude of an inductor current, ω represents an angular frequency of the inductor current, t represents time, L represents an inductance, $U_{dc}$ represents a voltage at a direct current side, and $U_{ac}$ represents a voltage at an alternate current side;

controlling the target switch transistor to be turned off when actual turn-on duration of the first target switch transistor matches the target turn-on duration; and controlling, after the first target inductor current reaches zero, in a same manner as the first target inductor current, a second target inductor current of the two inductor currents in the same direction, to alternately control the two inductor currents in the same direction under the discontinuous inductor current mode.

Preferably, after the acquiring a target on-time ratio corresponding to the first target inductor current in an entire switching period and before the acquiring target turn-on duration corresponding to the target inductor current in the entire switching period based on the target on-time ratio, the method further includes: multiplying the target on-time ratio by a positive coefficient α to obtain a product, as the target on-time ratio corresponding to the first target inductor current in the entire switching period.

Preferably, the method further includes: shifting phases of the two inductor currents in the same direction based on a power factor demand, to generate a phase difference between an inductor current and a power grid voltage in the power grid cycle.

To solve the above technical problems, a system for controlling a three-phase grid-connected inverter is further provided according to an embodiment of the present disclosure. The system is applied to a three-phase three-leg grid-connected inverter including a filter capacitor. One terminal of the filter capacitor is connected to an output inductor of a corresponding bridge leg, and the other terminal of the filter capacitor is connected to a negative electrode of a direct current input bus. The system includes: a cycle dividing module and an alternately controlling module.

The cycle dividing module is configured to divide a power grid cycle into multiple equal intervals. In each of the multiple equal intervals, two inductor currents are in a same direction, and a third inductor current is in a direction opposite to the direction of the two inductor currents.

The alternately controlling module is to control, in an interval of the power grid cycle, the two inductor currents in the same direction under a discontinuous inductor current mode, to control fundamental wave components of the two inductor currents in the same direction to be sine waves in the power grid cycle.

Preferably, the two inductor currents in the same direction are controlled under the discontinuous inductor current mode by:

controlling, when controlling a first target inductor current of the two inductor currents in the same direction, a target switch transistor corresponding to the target inductor current to be turned on;

acquiring a target inductor peak current corresponding to the first target inductor current according to a predetermined inductor peak current calculation expression:

$$\Delta I = \sqrt{\frac{T \times I \sin\omega t}{L} \frac{(U_{dc}^2 - U_{ac}^2)}{U_{dc}}}$$

where ΔI represents an inductor peak current, T represents an entire switching cycle in an interval, I represents an amplitude of an inductor current, ω represents an angular frequency of the inductor current, t represents time, L represents an inductance, $U_{dc}$ represents a voltage at a direct current side, and $U_{ac}$ represents a voltage at an alternate current side;

acquiring an actual current corresponding to the first target inductor current, and controlling the target switch transistor to be turned off when the actual current reaches the target inductor peak current; and controlling, after the first target inductor current reaches zero, in a same manner as the first target inductor current, a second target inductor current of the two inductor currents in the same direction, to alternately control the two inductor currents in the same direction under the discontinuous inductor current mode.

Preferably, the two inductor currents in the same direction are controlled under the discontinuous inductor current mode by:

controlling, when controlling a first target inductor current of the two inductor currents in the same direction, a target switch transistor corresponding to the first target inductor current to be turned on;

acquiring a target on-time ratio corresponding to the first target inductor current in an entire switching period according to a predetermined on-time ratio calculation expression:

$$D = \sqrt{\frac{L \times I \sin\omega t}{T} \frac{(U_{dc} + U_{ac})}{U_{dc}(U_{dc} - U_{ac})}},$$

and acquiring target turn-on duration corresponding to the target inductor current in the entire switching period based on the target on-time ratio, where T represents an entire switching cycle in an interval, D represents an on-time ratio in the entire switching cycle, I represents an amplitude of an inductor current, ω represents an angular frequency of the inductor current, t represents time, L represents an inductance, $U_{dc}$ represents a voltage at a direct current side, and $U_{ac}$ represents a voltage at an alternate current side;

controlling the target switch transistor to be turned off when actual turn-on duration of the first target switch transistor matches the target turn-on duration; and controlling, after the first target inductor current reaches zero, in a same manner as the first target inductor current, a second target inductor current of the two inductor currents in the same direction, to alternately control the two inductor currents in the same direction under the discontinuous inductor current mode.

To solve the above technical problems, a three-phase grid-connected inverter is further provided according to an embodiment of the present disclosure. The three-phase grid-connected inverter includes six switch transistors, three output inductors and three filter capacitors.

First terminals of a first switch transistor, a third switch transistor and a fifth switch transistor are all connected to a positive electrode of a direct current input bus. Second terminals of a second switch transistor, a fourth switch transistor and a sixth switch transistor are all connected to a negative electrode of the direct current input bus. A second terminal of the first switch transistor is connected to a first terminal of the second switch transistor, and a common terminal of the first switch transistor and the second switch transistor is connected to a first terminal of a first output inductor. A second terminal of the third switch transistor is connected to a first terminal of the fourth switch transistor, and a common terminal of the third switch transistor and the fourth switch transistor is connected to a first terminal of a second output inductor. A second terminal of the fifth switch transistor is connected to a first terminal of the sixth switch transistor, and a common terminal of the fifth switch transistor and the sixth switch transistor is connected to a first terminal of a third output inductor. A second terminal of the first output inductor is connected to a first terminal of a first filter capacitor, and a common terminal of the first output inductor and the first filter capacitor is connected to an A phase line of a power grid. A second terminal of the second output inductor is connected to a first terminal of a second filter capacitor, and a common terminal of the second output inductor and the second filter capacitor is connected to a B phase line of the power grid. A second terminal of the third output inductor is connected to a first terminal of a third filter capacitor, and a common terminal of the third output inductor and the third filter capacitor is connected to a C phase line of the power grid. Second terminals of the first filter capacitor, the second filter capacitor, and the third filter capacitor are connected to the negative electrode of the direct current input bus.

The three-phase grid-connected inverter is controlled by the above method for controlling a three-phase grid-connected inverter.

A method for controlling a three-phase grid-connected inverter is provided according to the present disclosure. The method is applied to a three-phase three-leg grid-connected inverter. In the present disclosure, a structure of the three-phase three-leg grid-connected inverter is improved. Specifically, the filter capacitor is connected to the negative electrode of the direct current input bus to form a filter loop, to filter out the harmonics in the circuit. Therefore, a grid-connected current at low power has high quality without increasing the inductance, and the parallel inverter devices in the system operate stably. The method is suitable for the photovoltaic micro-inverter. Moreover, the three-phase three-leg grid-connected inverter of the present disclosure operates under the discontinuous inductor current mode. That is, the inductor current reaches zero in a switching cycle, thereby reducing switching loss of the three-phase three-leg grid-connected inverter.

A system for controlling a three-phase grid-connected inverter and a three-phase grid-connected inverter are further provided according to the present disclosure. The system and the three-phase grid-connected inverter have the same beneficial effects as the method.

BRIEF DESCRIPTION OF THE DRAWINGS

For clearer illustration of technical solutions according to embodiments of the present disclosure, the drawings to be applied in embodiments of the present disclosure or in the conventional technology are briefly described hereinafter. Apparently, the drawings in the following descriptions show only some embodiments of the present disclosure, and other drawings may be obtained by those skilled in the art based on the provided drawings without creative efforts.

FIG. 1 is a schematic structural diagram of an existing three-phase three-leg grid-connected inverter;

FIG. 2 is a flowchart of a method for controlling a three-phase grid-connected inverter according to an embodiment of the present disclosure;

DETAILED DESCRIPTION OF THE EMBODIMENTS

A three-phase grid-connected inverter, and a method and a system for controlling the three-phase grid-connected inverter are provided according to the present disclosure. With technical solutions in the present disclosure, harmonics in a circuit can be filtered out, and high-quality grid-connected current at low power is achieved. That is, without increasing the inductance, the paralleled inverter devices in the system can operate stably. The technical solutions in the present disclosure are suitable for a photovoltaic micro-inverter. Moreover, the three-phase three-leg grid-connected inverter according to the present disclosure operates under a discontinuous inductor current mode, thereby reducing switching loss of a three-phase three-leg grid-connected inverter.

The technical solutions in the embodiments of the present disclosure are described clearly and completely in conjunction with the accompanying drawings in the embodiments of the present disclosure, so that objects, technical solutions and advantages of the embodiments of the present disclosure are clearer. It is apparent that the described embodiments are part rather than all of the embodiments of the present disclosure. Based on the embodiments in the present disclosure, all other embodiments obtained by those skilled in the art without creative work shall fall within the protection scope of the present disclosure.

Reference is made to FIG. 2, which is a flowchart of a method for controlling a three-phase grid-connected inverter according to an embodiment of the present disclosure.

The method is applied to a three-phase three-leg grid-connected inverter including a filter capacitor. One terminal of the filter capacitor is connected to an output inductor of a corresponding bridge leg, and the other terminal of the filter capacitor is connected to a negative electrode of a direct current input bus. The method includes the following steps S1 to S2.

In step S1, a power grid cycle is divided into multiple equal intervals. In each of the multiple equal intervals, two inductor currents are in the same direction, and other inductor current is in a direction opposite to the direction of the two inductor currents.

Figure 3:
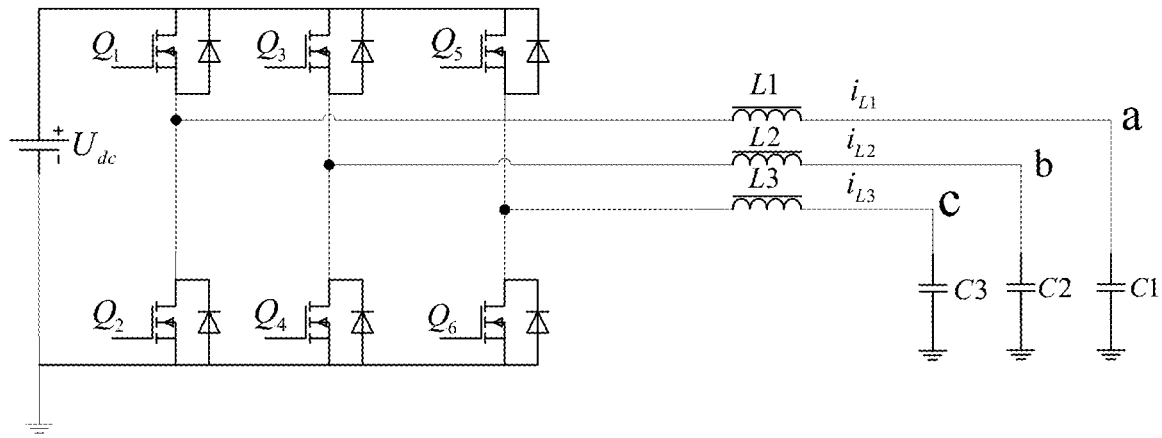
FIG. 3 is a schematic structural diagram of a three-phase three-leg grid-connected inverter according to an embodiment of the present disclosure.

A structure of the three-phase three-leg grid-connected inverter according to the present disclosure is first described. In the present disclosure, improvements are made to a structure of a traditional three-phase three-leg grid-connected inverter (where reference is made to FIG. 3, which is a schematic structural diagram of a three-phase three-leg grid-connected inverter according to an embodiment of the present disclosure). In FIG. 3, a first switch transistor Q1 and a second switch transistor Q2 form a first bridge leg of the three-phase three-leg grid-connected inverter. A third switch transistor Q3 and a fourth switch transistor Q4 form a second bridge leg of the three-phase three-leg grid-connected inverter, and a fifth switch transistor Q5 and a sixth switch transistor Q6 form a third bridge leg of the three-phase three-leg grid-connected inverter. For each of the three bridge legs, a midpoint of the bridge leg is connected in series with an output inductor and a filter capacitor. For each of three filter capacitors C1, C2 and C3, one terminal of the filter capacitor is connected to the output inductor on the bridge leg corresponding to the filter capacitor, and the other terminal of the filter capacitor is connected to a negative electrode of a direct current input bus (by grounding the negative electrode of the direct current input bus and the other terminal of the filter capacitor), to form a filter circuit, so as to filter out the harmonics in the circuit. In this way, high-quality grid-connected current at low power is achieved increasing the inductance, so that parallel inverter devices in a system can operate stably, which is suitable for a photovoltaic micro-inverter.

Since inductor currents in three phases of the three-phase three-leg grid-connected inverter are symmetrical, that is, a sum of the inductor currents in the three phases is equal to 0, first and second inductor currents are directly controlled so that the third inductor current is indirectly controlled. Referring to FIG. 3, when the first switch transistor Q1 and the fourth switch transistor Q4 are turned on (in operation), an inductor current $i_{L2}$ of a second output inductor L2 flows through a first output inductor L1, the second output inductor L2, and an alternating current side Vab. When the first switch transistor Q1 and the sixth switch transistor Q6 are turned on, an inductor current $i_{L3}$ of a third output inductor L3 flows through the first output inductor L1, the third output inductor L3, and an alternating current side Vca. The inductor current $i_{L2}$ of the second output inductor L2 is controlled to be in the same phase as a voltage of a phase B of the power grid, as an inductor current in the phase B. The inductor current $i_{L3}$ of the third output inductor L3 is controlled to be in the same phase as a voltage of a phase C of the power grid, as an inductor current in the phase C. Therefore, an inductor current $i_{L1}=-(i_{L2}+i_{L3})$ flowing through the first output inductor L1 serves as an inductor current in a phase A. That is, by controlling inductor currents in any two phases, an inductor current in the third phase is formed. The inductor current in the third phase is the opposite of a sum of the inductor currents in the two phases.

Figure 4:
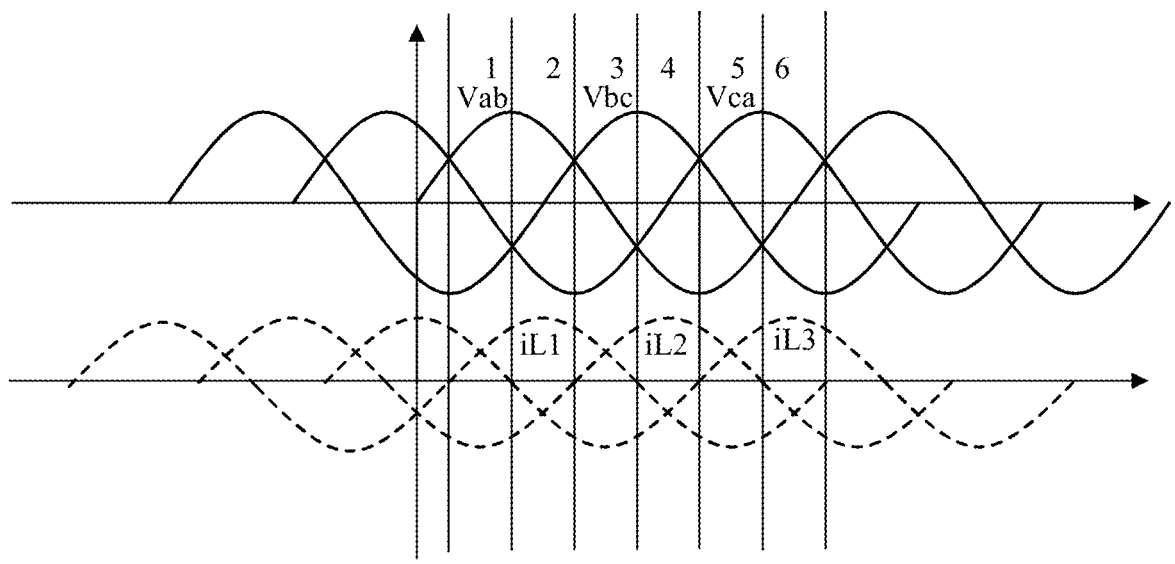
FIG. 4 is a schematic diagram showing division of a power grid cycle according to an embodiment of the present disclosure.

In view of the above, in the present disclosure, a power grid cycle is divided into multiple equal intervals, as shown in FIG. 4. In each of the multiple equal intervals, two inductor currents are in the same direction, and other inductor current is in a direction opposite to the direction of the two inductor currents. Therefore, in any of the multiple equal intervals, two inductor currents in the same direction are directly controlled, so that the third inductor current in an opposite direction is indirectly controlled.

In step S2, in an interval of the power grid cycle, the two inductor currents in the same direction are controlled under a discontinuous inductor current mode, so that fundamental wave components of the two inductor currents in the same direction are both sine waves in the power grid cycle.

Specifically, it can be seen from step S1 that the power grid cycle is divided based on a zero-crossing of the inductor currents in the three phases. The power grid cycle is divided into six intervals. In each of the six intervals, two inductor currents in the same direction are controlled. Table 1 shows two inductor currents controlled in every interval. Table 2 shows switch transistors in operation corresponding to inductor currents controlled in every interval.

TABLE 1

| Interval | 1 | 2 | 3 | 4 | 5 | 6 |
|---|---|---|---|---|---|---|
| Controlled inductor currents | $i_{L1}, i_{L3}$ | $i_{L2}, i_{L3}$ | $i_{L1}, i_{L2}$ | $i_{L1}, i_{L3}$ | $i_{L2}, i_{L3}$ | $i_{L1}, i_{L2}$ |

TABLE 2

| Interval | 1 | 2 | 3 | 4 | 5 | 6 |
|---|---|---|---|---|---|---|
| Working switch tubes | Q4 Q1<br>Q4 Q5 | Q1 Q4<br>Q1 Q6 | Q6 Q1<br>Q6 Q3 | Q3 Q6<br>Q3 Q2 | Q2 Q3<br>Q2 Q5 | Q5 Q2<br>Q5 Q4 |

Figure 5:
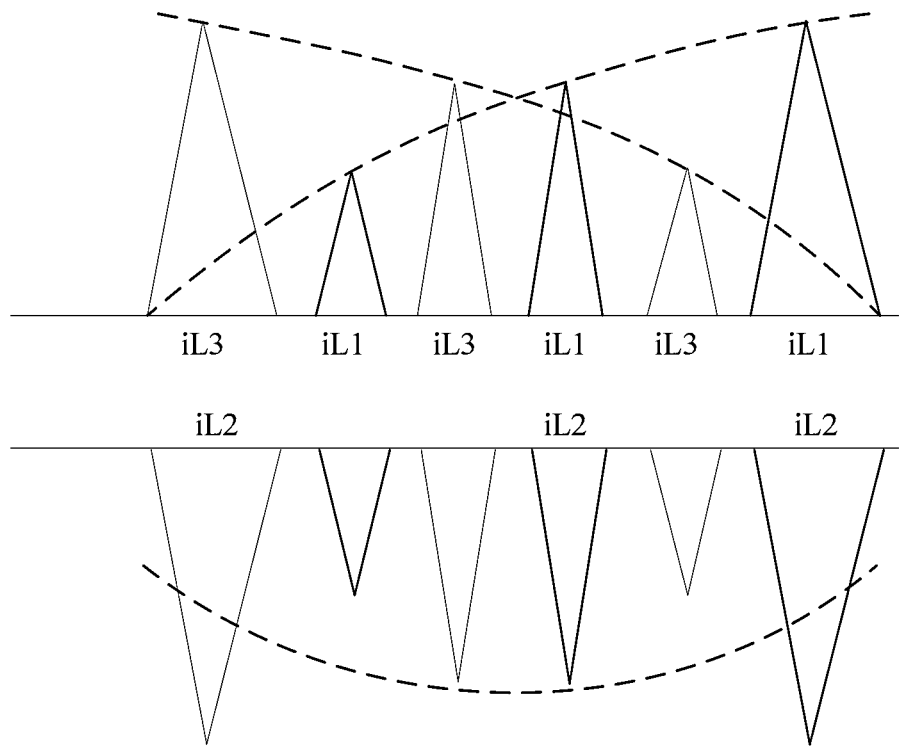
FIG. 5 is a schematic diagram showing a waveform of an inductor current in an interval 1 of the power grid cycle according to an embodiment of the present disclosure.

In each interval, inductor currents in two phases controlled in the interval correspond to a same output inductor. Further, the output inductors in the present disclosure operate in a discontinuous mode. Therefore, in order to ensure completion of the inductor current of each phase, the inductor current of one phase is controlled after the inductor current of the other phase reaches zero. That is, the two inductor currents in the same direction in each interval are controlled alternately. Alternatively, two pairs of switch transistors in each interval are turned on alternately, so that the fundamental wave components of the two inductor currents in the same direction are both sine waves in the power grid cycle (where the fundamental wave components of the two directly controlled inductor currents are sine waves, and a fundamental wave component of the indirectly controlled inductor current is also a sine wave. For example, in an interval 1, waveforms of the three inductor currents are shown in FIG. 5, that is $i_{L1} \rightarrow i_{L3} \rightarrow i_{L1} \rightarrow i_{L3} \ldots$, and a dotted line represents a fundamental wave component of the corresponding inductor current). It can be seen that the three-phase three-leg grid-connected inverter of the present disclosure operates under the discontinuous inductor current mode. That is, the inductor current reaches zero in a switching cycle, thereby reducing switching loss of the three-phase three-leg grid-connected inverter.

A method for controlling a three-phase grid-connected inverter is provided according to the present disclosure. The method is applied to a three-phase three-leg grid-connected inverter. In the present disclosure, the structure of the three-phase three-leg grid-connected inverter is improved. Specifically, the filter capacitor is connected to the negative electrode of the direct current input bus to form a filter loop, to filter out the harmonics in the circuit. Therefore, a grid-connected current at low power has high quality without increasing the inductance, and the parallel inverter devices in the system operate stably. The method is suitable for the photovoltaic micro-inverter. Moreover, the three-phase three-leg grid-connected inverter of the present disclosure operates under the discontinuous inductor current mode. That is, the inductor current reaches zero in a switching cycle, thereby reducing switching loss of the three-phase three-leg grid-connected inverter.

Based on the above embodiments, in an embodiment, the two inductor currents in the same direction are controlled under a discontinuous inductor current mode by:

when controlling a first target inductor current of the two inductor currents in the same direction, controlling a target switch transistor corresponding to the first target inductor current to be turned on;

calculating a target inductor peak current corresponding to the first target inductor current according to the following predetermined inductor peak current calculation expression:

$$\Delta I = \sqrt{\frac{T \times I \sin\omega t}{L} \frac{(U_{dc}^2 - U_{ac}^2)}{U_{dc}}}$$

where $\Delta I$ represents an inductor peak current, T represents an entire switching cycle in an interval, I represents an amplitude of an inductor current, $\omega$ represents an angular frequency of the inductor current, t represents time, L represents an inductance, $U_{dc}$ represents a voltage at a direct current side, and $U_{ac}$ represents a voltage at an alternate current side;

acquiring an actual current corresponding to the first target inductor current, and controlling the target switch transistor to be turned off when the actual current reaches the target inductor peak current; and after the first target inductor current reaches zero, controlling, in the same manner as the first target inductor current, a second target inductor current of the two inductor currents in the same direction, such that the two inductor currents in the same direction are controlled alternately under the discontinuous inductor current mode.

In the embodiment of the present disclosure, the inductor current is in the discontinuous, and a waveform of an output current is a sine wave. Therefore, the inductor peak current is calculated, and the switch transistor is controlled with the inductor peak current as a reference based on analog control, to generate a required inductor current.

Figure 6:
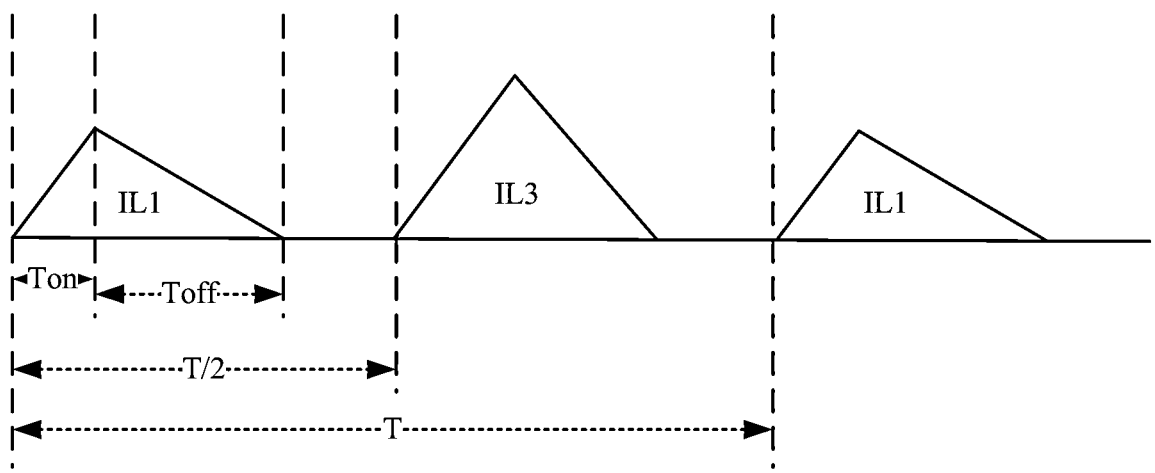
FIG. 6 is a schematic diagram showing control of the inductor current in the interval 1 of the power grid cycle according to an embodiment of the present disclosure.

Reference is made to FIG. 6, which is a schematic diagram showing control of the inductor current in the interval 1 of the power grid cycle according to an embodiment of the present disclosure. Ton represents turn-on duration, Toff represents turn-off duration, T represents an entire switching cycle in the interval, D represents a turn-on ratio, Dp represents a turn-off ratio, $U_{dc}$ represents a voltage at a direct current side, $U_{ac}$ represents a voltage at an alternate current side, $\Delta I$ represents an inductor peak current, and L represents an inductance.

$$Ton = D \times T = \frac{\Delta I \times L}{U_{dc} - U_{ac}}; \quad (1)$$

$$Toff = Dp \times T = \frac{\Delta I \times L}{U_{dc} + U_{ac}}; \quad (2)$$

An inductor peak current in the switching cycle is represented as $\Delta I$, and an inductor average current in the switching cycle is represented as $I \sin \omega t$, and $$\frac{\Delta I \times (Ton + Toff)}{2T} = I \sin\omega t; \quad (3)$$

Expressions (1) and (2) are substituted into (3), to obtain the following expression (4):

$$\frac{\Delta I^2 \times L}{2T} \frac{2U_{dc}}{U_{dc}^2 - U_{ac}^2} = I \sin\omega t; \quad (4)$$

Therefore, the inductor peak current is calculated according to the expression (5):

$$\Delta I = \sqrt{\frac{T \times I \sin\omega t}{L} \frac{(U_{dc}^2 - U_{ac}^2)}{U_{dc}}}. \quad (5)$$

Based on this, when controlling a target inductor current (that is, the first target inductor current) of the two inductor currents in the same direction, a target switch transistor corresponding to the target inductor current is controlled to be turned on (for example, when controlling $i_{L1}$ in the interval 1, the fourth switch transistor Q4 and the first switch transistor Q1 are controlled to be turned on). A target inductor peak current corresponding to the target inductor current is calculated according to the inductor peak current calculation expression $$\Delta I = \sqrt{\frac{T \times I \sin\omega t}{L} \frac{(U_{dc}^2 - U_{ac}^2)}{U_{dc}}}.$$

An actual current corresponding to the target inductor current is acquired. When the actual current reaches the target inductor peak current, the target switch transistor are controlled to be turned off (for example, when controlling $i_{L1}$ in the interval 1, an actual current flowing through the first output inductor L1, and the fourth switch transistor Q4 and the first switch transistor Q1 are controlled to be turned off when the actual current reaches the target inductor peak current). After the target inductor current reaches zero, the other target inductor current (that is, the second target inductor current) of the two inductor currents in the same direction is controlled in the same manner as the first target inductor current (for example, when controlling inductor currents in the interval 1, $i_{L3}$ is controlled in the same manner as $i_{L1}$ after $i_{L1}$ reaches zero). After the second target inductor current reaches zero, the first target inductor current is controlled in the same manner, and the second target inductor current is controlled after the first target inductor current reaches zero, and so on, until the interval ends. In this way, in the interval, the two inductor currents in the same direction are alternately controlled under the discontinuous inductor current mode.

Figure 7:
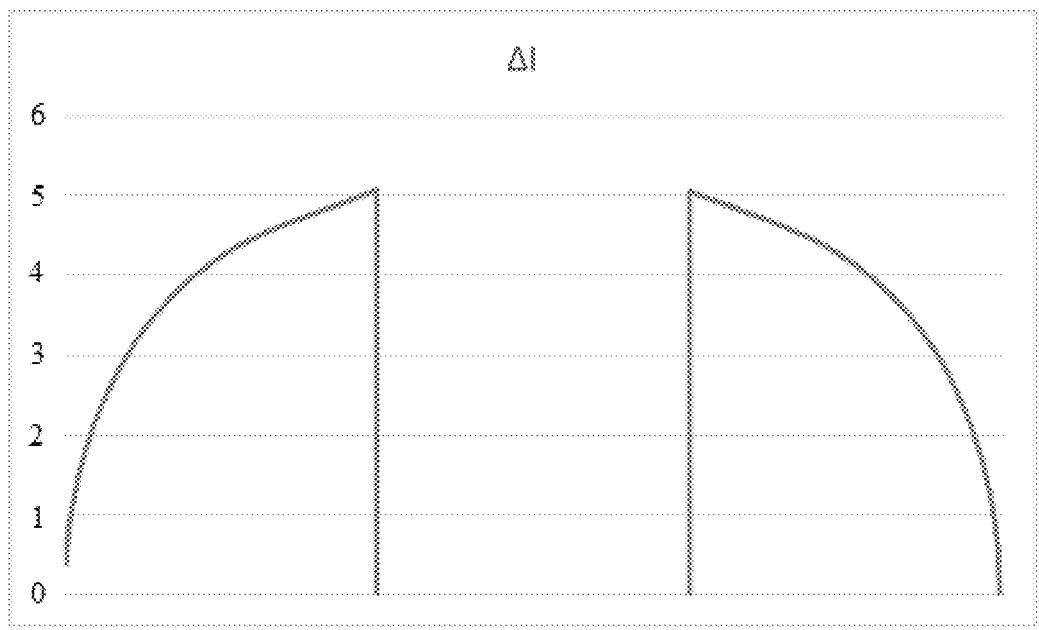
FIG. 7 is a schematic diagram showing a waveform of an inductor peak current of a phase in half the power grid cycle according to an embodiment of the present disclosure.

Reference is made to FIG. 7, which is a schematic diagram showing a waveform of an inductor peak current of a phase in half the power grid cycle according to an embodiment of the present disclosure. It can be seen from FIG. 7 that, a line voltage corresponding to $U_{ac}$ at a phase angle ranging from 0 to 60 degrees is different from a line voltage corresponding to $U_{ac}$ at a phase angle ranging from 120 degrees to 180 degrees, and no $\Delta I$ corresponding to a phase angle ranging from 60 degrees to 120 degrees since the inductor current of this phase is a sum of inductor currents of other two phases.

In an embodiment, after the acquiring the target inductor peak current corresponding to the target inductor current and before the actual current reaches the target inductor peak current, the method further includes: multiplying the target inductor peak current by a positive coefficient α to obtain a product, as the target inductor peak current corresponding to the target inductor current.

This embodiment is not described here in detail, and is introduced together with subsequent embodiments.

In an embodiment, the two inductor currents in the same direction are controlled under the discontinuous inductor current mode by:

when controlling a first target inductor current of the two inductor currents in the same direction, controlling a target switch transistor corresponding to the first target inductor current to be turned on;

acquiring a target on-time ratio corresponding to the target inductor current in the entire switching period according to the following predetermined on-time ratio calculation expression:

$$D = \sqrt{\frac{L \times I \sin\omega t}{T} \frac{(U_{dc} + U_{ac})}{U_{dc}(U_{dc} - U_{ac})}},$$

and acquiring target turn-on duration corresponding to the target inductor current in the entire switching period based on the target on-time ratio, where T represents an entire switching cycle in an interval, D represents an on-time ratio in the entire switching cycle, I represents an amplitude of an inductor current, ω represents an angular frequency of the inductor current, t represents time, L represents an inductance, $U_{dc}$ represents a voltage at a direct current side, and $U_{ac}$ represents a voltage at an alternate current side;

after the first target inductor current reaches zero, controlling, in the same manner as the first target inductor current, a second target inductor current of the two inductor currents in the same direction, such that the two inductor currents in the same direction are controlled alternately under the discontinuous inductor current mode.

Alternatively, in the present disclosure, a duty cycle is calculated to perform digital control. The switch transistor is directly controlled based on the duty cycle, so as to generate the required inductor current.

The following expressions are obtained from expressions (1) and (2).

$$\frac{D}{Dp} = \frac{U_{dc} + U_{ac}}{U_{dc} - U_{ac}}; \qquad (6)$$

$$Dp = \frac{D(U_{dc} - U_{ac})}{U_{dc} + U_{ac}}; \qquad (7)$$

$$D + Dp = \frac{2D \times U_{dc}}{U_{dc} + U_{ac}}; \qquad (8)$$

$$Ton + Toff = (D + Dp)T = \frac{2D \times U_{dc}}{U_{dc} + U_{ac}} T; \qquad (9)$$

Further, I sin ωt is represented as $$\frac{\Delta I \times (Ton + Toff)}{2T} = I \sin\omega t;$$

Expressions (1) and (9) are substituted into (3), to obtain the following expression (11):

$$\frac{1}{2T} \frac{D \times T(U_{dc} - U_{ac})}{L} \frac{2D \times U_{dc}}{(U_{dc} + U_{ac})} T = I \sin\omega t; \qquad (11)$$

Therefore, the on-time ratio calculation expression is represent as expression (12):

$$D = \sqrt{\frac{L \times I \sin\omega t}{T} \frac{(U_{dc} + U_{ac})}{U_{dc}(U_{dc} - U_{ac})}}. \qquad (12)$$

Based on this, when controlling a target inductor current (that is, the first target inductor current) of the two inductor currents in the same direction, a target switch transistor corresponding to the target inductor current is controlled to be turned on. A target on-time ratio corresponding to the target inductor current in the entire switching period is acquired according to the following on-time ratio calculation expression $$D = \sqrt{\frac{L \times I \sin\omega t}{T} \frac{(U_{dc} + U_{ac})}{U_{dc}(U_{dc} - U_{ac})}}.$$

Target turn-on duration Ton=D*T corresponding to the target inductor current in the entire switching period based on the target on-time ratio is acquired based on the target on-time ratio. How long the target switch transistor is turned on is timed from a time instant when the target switch transistor is turned on. When actual turn-on duration (that is, timed duration) of the target on-time ratio reaches the target turn-on duration, the target switch transistor is controlled to be turned off. After the target inductor current reaches zero, the other target inductor current (that is, the second target inductor current) of the two inductor currents in the same direction is controlled in the same manner as the first target inductor current. After the second target inductor current reaches zero, the first target inductor current is controlled in the same manner, and the second target inductor current is controlled after the first target inductor current reaches zero, and so on, until the interval ends. In this way, in the interval, the two inductor currents in the same direction are alternately controlled under the discontinuous inductor current mode.

Figure 8:
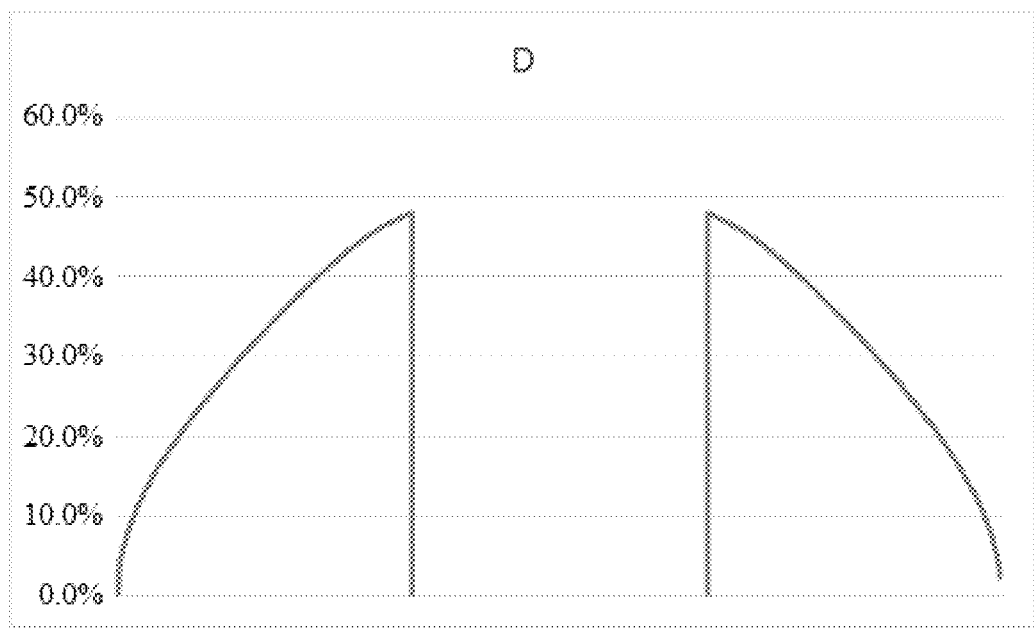
FIG. 8 is a schematic diagram showing a waveform of a duty cycle of a phase in half the power grid cycle according to an embodiment of the present disclosure.

Reference is made to FIG. 8, which is a schematic diagram showing a waveform of a duty cycle of a phase in half the power grid cycle according to an embodiment of the present disclosure. It can be seen from FIG. 8 that, a line voltage corresponding to $U_{ac}$ at a phase angle ranging from 0 to 60 degrees is different from a line voltage corresponding to $U_{ac}$ at a phase angle ranging from 120 degrees to 180 degrees, and no D corresponding to a phase angle ranging from 60 degrees to 120 degrees since the inductor current of this phase is a sum of inductor currents of other two phases.

In an embodiment, after the acquiring a target on-time ratio corresponding to the target inductor current in the entire switching period and before the acquiring target turn-on duration corresponding to the target inductor current in the entire switching period, the method further includes: multiplying the target on-time ratio by a positive coefficient α to obtain a product, as the target on-time ratio corresponding to the target inductor current in the entire switching cycle.

Further, since the two inductor currents in the same direction are alternately controlled, therefore $$Ton + Toff < \frac{T}{2}$$

The following expressions (13) and (14) are obtained from expression (9).

$$\frac{2D \times U_{dc}}{U_{dc} + U_{ac}} T < \frac{T}{2}; \quad (13)$$

$$\left(\frac{2D \times U_{dc}}{U_{dc} + U_{ac}} T\right)^2 < \frac{T^2}{4}; \quad (14)$$

Expression (12) is substituted into (14), to obtain the following expression (15)

$$T > \frac{16 I \sin\omega t \times L \times U_{dc}}{U_{dc}^2 - U_{ac}^2}; \quad (15)$$

In order to reduce a ripple, T varies with I. According to expression (15), T and I has a relationship of T∝I. T changes in the same proportion with I. I and T both has a change coefficient α.

$$\Delta I' = \sqrt{\frac{\alpha T \times \alpha I \sin\omega t}{L} \frac{(U_{dc}^2 - U_{ac}^2)}{U_{dc}}}; \quad (17)$$

$$\Delta I' = \alpha \sqrt{\frac{T \times I \sin\omega t}{L} \frac{(U_{dc}^2 - U_{ac}^2)}{U_{dc}}}; \quad (18)$$

$$D' = \alpha \sqrt{\frac{L \times I \sin\omega t}{T} \frac{(U_{dc} + U_{ac})}{U_{dc}(U_{dc} - U_{ac})}}; \quad (19)$$

By adjusting the change coefficient α, power of the full bridge can be controlled.

In an embodiment, the method further includes: shifting phases of the two inductor currents in the same direction based on a power factor demand, to generate a phase difference between the inductor current and a power grid voltage in the power grid cycle.

Further, the phase of the inductor current is not related to the phase of the grid voltage. The phases of the two inductor currents in the same direction are shifted (where a phase of the third inductor current shifts accordingly), so that the phase difference between the inductor current and the power grid voltage is generated, and a power factor ranges from 0 to 1. Based on this, the phases of the two inductor currents in the same direction are shifted meet the current power factor demand.

A system for controlling a three-phase grid-connected inverter is provided according to embodiments of the present disclosure. The system is applied to a three-phase three-leg grid-connected inverter including a filter capacitor. One terminal of the filter capacitor is connected to an output inductor of a corresponding bridge leg, and the other terminal of the filter capacitor is connected to a negative electrode of a direct current input bus. The system includes a cycle dividing module and an alternately controlling module.

The cycle dividing module is configured to divide a power grid cycle into multiple equal intervals. In each of the multiple equal intervals, two inductor currents are in the same direction, and other inductor current is in a direction opposite to the direction of the two inductor currents.

The alternately controlling module is configured to control, in an interval of the power grid cycle, the two inductor currents in the same direction under a discontinuous inductor current mode, so that fundamental wave components of the two inductor currents in the same direction are both sine waves in the power grid cycle.

In an embodiment, the two inductor currents in the same direction are controlled under a discontinuous inductor current mode by:

when controlling a first target inductor current of the two inductor currents in the same direction, controlling a target switch transistor corresponding to the first target inductor current to be turned on;

calculating a target inductor peak current corresponding to the first target inductor current according to the following predetermined inductor peak current calculation expression:

$$\Delta I = \sqrt{\frac{T \times I \sin\omega t}{L} \frac{(U_{dc}^2 - U_{ac}^2)}{U_{dc}}}$$

where ΔI represents an inductor peak current, T represents an entire switching cycle in an interval, I represents an amplitude of an inductor current, ω represents an angular frequency of the inductor current, t represents time, L represents an inductance, $U_{dc}$ represents a voltage at a direct current side, and $U_{ac}$ represents a voltage at an alternate current side;

acquiring an actual current corresponding to the first target inductor current, and controlling the target switch transistor to be turned off when the actual current reaches the target inductor peak current; and after the first target inductor current reaches zero, controlling, in the same manner as the first target inductor current, a second target inductor current of the two inductor currents in the same direction, such that the two inductor currents in the same direction are controlled alternately under the discontinuous inductor current mode.

In another embodiment, the two inductor currents in the same direction are controlled under the discontinuous inductor current mode by:

when controlling a first target inductor current of the two inductor currents in the same direction, controlling a target switch transistor corresponding to the first target inductor current to be turned on;

acquiring a target on-time ratio corresponding to the target inductor current in the entire switching period according to the following predetermined on-time ratio calculation expression:

$$D = \sqrt{\frac{L \times I \sin\omega t}{T} \frac{(U_{dc} + U_{ac})}{U_{dc}(U_{dc} - U_{ac})}},$$

and acquiring target turn-on duration corresponding to the target inductor current in the entire switching period based on the target on-time ratio, where T represents an entire switching cycle in an interval, D represents an on-time ratio in the entire switching cycle, I represents an amplitude of an inductor current, ω represents an angular frequency of the inductor current, t represents time, L represents an inductance, $U_{dc}$ represents a voltage at a direct current side, and $U_{ac}$ represents a voltage at an alternate current side;

when actual turn-on duration of the target switch transistor reaches the target turn-on duration, controlling the target switch transistor to be turned off; and after the first target inductor current reaches zero, controlling, in the same manner as the first target inductor current, a second target inductor current of the two inductor currents in the same direction, such that the two inductor currents in the same direction are controlled alternately under the discontinuous inductor current mode.

For the system in the present disclosure, reference is made to the embodiments of the above-mentioned method. Therefore, the system is not described in detail herein.

A three-phase grid-connected inverter is further provided according to the present disclosure. The three-phase grid-connected inverter includes six switch transistors, three output inductors and three filter capacitors First terminals of a first switch transistor, a third switch transistor and a fifth switch transistor are all connected to a positive electrode of a direct current input bus. Second terminals of a second switch transistor, a fourth switch transistor and a sixth switch transistor are all connected to a negative electrode of the direct current input bus. A second terminal of the first switch transistor is connected to a first terminal of the second switch transistor, and a common terminal of the first switch transistor and the second switch transistor is connected to a first terminal of a first output inductor. A second terminal of the third switch transistor is connected to a first terminal of the fourth switch transistor, and a common terminal of the third switch transistor and the fourth switch transistor is connected to a first terminal of a second output inductor. A second terminal of the fifth switch transistor is connected to a first terminal of the sixth switch transistor, and a common terminal of the fifth switch transistor and the sixth switch transistor is connected to a first terminal of a third output inductor. A second terminal of the first output inductor is connected to a first terminal of a first filter capacitor, and a common terminal of the first output inductor and the first filter capacitor is connected to an A phase line of a power grid. A second terminal of the second output inductor is connected to a first terminal of a second filter capacitor, and a common terminal of the second output inductor and the second filter capacitor is connected to a B phase line of the power grid. A second terminal of the third output inductor is connected to a first terminal of a third filter capacitor, and a common terminal of the third output inductor and the third filter capacitor is connected to a C phase line of the power grid. Second terminals of the first filter capacitor, the second filter capacitor, and the third filter capacitor are connected to the negative electrode of the direct current input bus.

The three-phase grid-connected inverter is controlled by the method for controlling a three-phase grid-connected inverter according to any one of the above embodiments.

For the three-phase grid-connected inverter (as shown in FIG. 3) according to the present disclosure, reference is made to the embodiments of the above-mentioned method. Therefore, the three-phase grid-connected inverter is not described in detail herein.

It should further be noted that, the relationship terms such as "first", "second" and the like are only used herein to distinguish one entity or operation from another, rather than to necessitate or imply that an actual relationship or order exists between the entities or operations. Furthermore, the terms such as "include", "comprise" or any other variants thereof intended to be non-exclusive. Therefore, a process, method, article or device including a series of elements include not only the disclosed elements but also other elements that are not clearly enumerated, or further include elements inherent for the process, method, article or device. Unless expressively limited, the statement "including a . . . " does not exclude the case that other similar elements may exist in the process, method, article or device.

The disclosed embodiments are described above, so that those skilled in the art can implement or use the present disclosure. Various modifications to these embodiments are apparent to those skilled in the art, and the general principle defined herein may be implemented in other embodiments without deviating from the spirit or scope of the present disclosure. Therefore, the present disclosure is not limited to these embodiments described herein, but in accordance with the widest scope consistent with the principle and novel features disclosed herein.

The invention claimed is:

1. A method for controlling a three-phase grid-connected inverter, wherein the method is applied to a three-phase three-leg grid-connected inverter comprising a filter capacitor, wherein one terminal of the filter capacitor is connected to an output inductor of a corresponding bridge leg, and the other terminal of the filter capacitor is connected to a negative electrode of a direct current input bus; and the method comprises:

dividing a power grid cycle into a plurality of equal intervals, wherein in each of the plurality of equal intervals, two inductor currents are in a same direction, and a third inductor current is in a direction opposite to the direction of the two inductor currents;

in an interval of the power grid cycle, controlling the two inductor currents in the same direction under a discontinuous inductor current mode, to control fundamental wave components of the two inductor currents in the same direction to be sine waves in the power grid cycle; and shifting phases of the two inductor currents in the same direction based on a power factor demand, to generate a phase difference between each of the two inductor currents in the same direction as well as the third inductor current and a power grid voltage in the power grid cycle.

2. The method for controlling the three-phase grid-connected inverter according to claim 1, wherein the controlling the two inductor currents in the same direction under a discontinuous inductor current mode comprises:

controlling, when controlling a first target inductor current of the two inductor currents in the same direction, a target switch transistor corresponding to the first target inductor current to be turned on;

acquiring a target inductor peak current corresponding to the first target inductor current according to a predetermined inductor peak current calculation expression:

$$\Delta I = \sqrt{\frac{T \times I \sin\omega t}{L} \frac{(U_{dc}^2 - U_{ac}^2)}{U_{dc}}}$$

wherein $\Delta I$ represents an inductor peak current, T represents an entire switching cycle in an interval, I represents an amplitude of an inductor current, $\omega$ represents an angular frequency of the inductor current, t represents time, L represents an inductance, $U_{dc}$ represents a voltage at a direct current side, and $U_{ac}$ represents a voltage at an alternate current side;

acquiring an actual current corresponding to the first target inductor current, and controlling the target switch transistor to be turned off when the actual current reaches the target inductor peak current; and controlling, after the first target inductor current reaches zero, in a same manner as the first target inductor current, a second target inductor current of the two inductor currents in the same direction, to alternately control the two inductor currents in the same direction under the discontinuous inductor current mode.

3. The method for controlling the three-phase grid-connected inverter according to claim 2, wherein after the acquiring a target inductor peak current corresponding to the first target inductor current and before the actual current reaches the target inductor peak current, the method further comprises:

multiplying the target inductor peak current by a positive coefficient α to obtain a product, as the target inductor peak current corresponding to the first target inductor current.

4. The method for controlling the three-phase grid-connected inverter according to claim 1, wherein the controlling the two inductor currents in the same direction under a discontinuous inductor current mode comprises:

controlling, when controlling a first target inductor current of the two inductor currents in the same direction, a target switch transistor corresponding to the first target inductor current to be turned on;

acquiring a target on-time ratio corresponding to the first target inductor current in an entire switching period according to a predetermined on-time ratio calculation expression:

$$D = \sqrt{\frac{L \times I \sin\omega t}{T} \frac{(U_{dc} + U_{ac})}{U_{dc}(U_{dc} - U_{ac})}},$$

and acquiring target turn-on duration corresponding to the first target inductor current in the entire switching period based on the target on-time ratio, wherein T represents an entire switching cycle in an interval, D represents an on-time ratio in the entire switching cycle, I represents an amplitude of an inductor current, ω represents an angular frequency of the inductor current, t represents time, L represents an inductance, $U_{dc}$ represents a voltage at a direct current side, and $U_{ac}$ represents a voltage at an alternate current side;

controlling the target switch transistor to be turned off when actual turn-on duration of the first target switch transistor matches the target turn-on duration; and controlling, after the first target inductor current reaches zero, in a same manner as the first target inductor current, a second target inductor current of the two inductor currents in the same direction, to alternately control the two inductor currents in the same direction under the discontinuous inductor current mode.

5. The method for controlling the three-phase grid-connected inverter according to claim 4, wherein after the acquiring a target on-time ratio corresponding to the target inductor current in an entire switching period and before the acquiring target turn-on duration corresponding to the target inductor current in the entire switching period based on the target on-time ratio, the method further comprises:

multiplying the target on-time ratio by a positive coefficient a to obtain a product, as the target on-time ratio corresponding to the first target inductor current in the entire switching period.

6. A three-phase grid-connected inverter, comprising: six switch transistors, three output inductors and three filter capacitors, wherein first terminals of a first switch transistor, a third switch transistor and a fifth switch transistor are all connected to a positive electrode of a direct current input bus;

second terminals of a second switch transistor, a fourth switch transistor and a sixth switch transistor are all connected to a negative electrode of the direct current input bus;

a second terminal of the first switch transistor is connected to a first terminal of the second switch transistor, wherein a common terminal of the first switch transistor and the second switch transistor is connected to a first terminal of a first output inductor;

a second terminal of the third switch transistor is connected to a first terminal of the fourth switch transistor, wherein a common terminal of the third switch transistor and the fourth switch transistor is connected to a first terminal of a second output inductor;

a second terminal of the fifth switch transistor is connected to a first terminal of the sixth switch transistor, wherein a common terminal of the fifth switch transistor and the sixth switch transistor is connected to a first terminal of a third output inductor;

a second terminal of the first output inductor is connected to a first terminal of a first filter capacitor, wherein a common terminal of the first output inductor and the first filter capacitor is connected to an A phase line of a power grid;

a second terminal of the second output inductor is connected to a first terminal of a second filter capacitor, wherein a common terminal of the second output inductor and the second filter capacitor is connected to a B phase line of the power grid;

a second terminal of the third output inductor is connected to a first terminal of a third filter capacitor, wherein a common terminal of the third output inductor and the third filter capacitor is connected to a C phase line of the power grid; and second terminals of the first filter capacitor, the second filter capacitor, and the third filter capacitor are connected to the negative electrode of the direct current input bus, wherein the three-phase grid-connected inverter is controlled by the method for controlling the three-phase grid-connected inverter according to claim 1.

7. A system for controlling a three-phase grid-connected inverter, wherein the system is applied to a three-phase three-leg grid-connected inverter comprising a filter capacitor, wherein one terminal of the filter capacitor is connected to an output inductor of a corresponding bridge leg, and the other terminal of the filter capacitor is connected to a negative electrode of a direct current input bus; and the system comprises:

a cycle dividing module configured to divide a power grid cycle into a plurality of equal intervals, wherein in each of the plurality of equal intervals, two inductor currents are in a same direction, and a third inductor current is in a direction opposite to the direction of the two inductor currents; and an alternately controlling module configured to control, in an interval of the power grid cycle, the two inductor currents in the same direction under a discontinuous inductor current mode, to control fundamental wave components of the two inductor currents in the same direction to be sine waves in the power grid cycle, wherein phases of the two inductor currents in the same direction are shifted based on a power factor demand, to generate a phase difference between each of the two inductor currents in the same direction as well as the third inductor current and a power grid voltage in the power grid cycle.

8. The system for controlling the three-phase grid-connected inverter according to claim 7, wherein the two inductor currents in the same direction are controlled under the discontinuous inductor current mode by:

controlling, when controlling a first target inductor current of the two inductor currents in the same direction, a target switch transistor corresponding to the first target inductor current to be turned on;

acquiring a target inductor peak current corresponding to the first target inductor current according to a predetermined inductor peak current calculation expression:

$$\Delta I = \sqrt{\frac{T \times I\sin\omega t}{L} \frac{(U_{dc}^2 - U_{ac}^2)}{U_{dc}}}$$

wherein $\Delta I$ represents an inductor peak current, T represents an entire switching cycle in an interval, I represents an amplitude of an inductor current, $\omega$ represents an angular frequency of the inductor current, t represents time, L represents an inductance, $U_{dc}$ represents a voltage at a direct current side, and $U_{ac}$ represents a voltage at an alternate current side;

acquiring an actual current corresponding to the first target inductor current, and controlling the target switch transistor to be turned off when the actual current reaches the target inductor peak current; and controlling, after the first target inductor current reaches zero, in a same manner as the first target inductor current, a second target inductor current of the two inductor currents in the same direction, to alternately control the two inductor currents in the same direction under the discontinuous inductor current mode.

9. The system for controlling the three-phase grid-connected inverter according to claim 7, wherein the two inductor currents in the same direction are controlled under the discontinuous inductor current mode by:

controlling, when controlling a first target inductor current of the two inductor currents in the same direction, a target switch transistor corresponding to the first target inductor current to be turned on;

acquiring a target on-time ratio corresponding to the first target inductor current in an entire switching period according to a predetermined on-time ratio calculation expression:

$$D = \sqrt{\frac{L \times I\sin\omega t}{T} \frac{(U_{dc} + U_{ac})}{U_{dc}(U_{dc} - U_{ac})}},$$

and acquiring target turn-on duration corresponding to the first target inductor current in the entire switching period based on the target on-time ratio, wherein T represents an entire switching cycle in an interval, D represents an on-time ratio in the entire switching cycle, I represents an amplitude of an inductor current, $\omega$ represents an angular frequency of the inductor current, t represents time, L represents an inductance, $U_{dc}$ represents a voltage at a direct current side, and $U_{ac}$ represents a voltage at an alternate current side;

controlling the target switch transistor to be turned off when actual turn-on duration of the first target switch transistor matches the target turn-on duration; and controlling, after the first target inductor current reaches zero, in a same manner as the first target inductor current, a second target inductor current of the two inductor currents in the same direction, to alternately control the two inductor currents in the same direction under the discontinuous inductor current mode.

* * * * *